(12) United States Patent
Silverman et al.

(10) Patent No.: US 7,349,849 B2
(45) Date of Patent: Mar. 25, 2008

(54) SPACING FOR MICROPHONE ELEMENTS

(75) Inventors: Kim E. Silverman, Mountain View, CA (US); Devang K. Naik, San Jose, CA (US)

(73) Assignee: Apple, Inc., Cupertino, CA (US)

( * ) Notice: Subject to any disclaimer, the term of this patent is extended or adjusted under 35 U.S.C. 154(b) by 974 days.

(21) Appl. No.: 10/206,572

(22) Filed: Jul. 25, 2002

(65) Prior Publication Data

US 2003/0033148 A1    Feb. 13, 2003

Related U.S. Application Data

(60) Provisional application No. 60/311,025, filed on Aug. 8, 2001, provisional application No. 60/311,026, filed on Aug. 8, 2001.

(51) Int. Cl.
*G10L 21/00* (2006.01)

(52) U.S. Cl. .................. 704/270; 704/205; 704/216

(58) Field of Classification Search ............... 704/226, 704/252, 233, 231, 204, 246, 235, 205, 209, 704/227, 206, 216, 270, 237; 367/198; 381/333, 92
See application file for complete search history.

(56) References Cited

U.S. PATENT DOCUMENTS

| | | | |
|---|---|---|---|
| 4,241,286 A | | 12/1980 | Gordon |
| 5,353,376 A | * | 10/1994 | Oh et al. ................ 704/233 |
| 5,500,903 A | | 3/1996 | Gulli |
| 5,574,824 A | * | 11/1996 | Slyh et al. ............. 704/226 |
| 5,828,768 A | * | 10/1998 | Eatwell et al. ......... 381/333 |
| 6,535,610 B1 | * | 3/2003 | Stewart ................... 381/92 |
| 6,850,887 B2 | * | 2/2005 | Epstein et al. .......... 704/252 |
| 6,868,045 B1 | * | 3/2005 | Schroder ................ 367/198 |

FOREIGN PATENT DOCUMENTS

| | | |
|---|---|---|
| DE | 4126902 A1 | 2/1992 |
| EP | 0586996 A2 | 3/1994 |
| EP | 0867860 A2 | 9/1998 |
| EP | 0869697 A | 10/1998 |
| EP | 1091615 A1 | 4/2001 |
| JP | 02086397 | 3/1990 |
| WO | WO 97/29614 | 8/1997 |
| WO | WO97/29614 | 8/1997 |
| WO | WO00/68936 | 11/2000 |

OTHER PUBLICATIONS

U.S. Appl. No. 10/172,593, filed Jun. 13, 2002.
U.S. Appl. No. 10/206,130, filed Jul. 25, 2002.
Gilloire et al., "Innovative Speech Processing for Mobile Terminals: An Annotated Bibliography", Signal Processing, Elsevier, Jul. 2000, pp. 1149-1166.

(Continued)

*Primary Examiner*—Huyen X. Vo
(74) *Attorney, Agent, or Firm*—Beyer Weaver LLP

(57) ABSTRACT

A speech recognition device with a frequency range with an upper frequency limit $f_{max}$ is provided. The speech recognition device has more than two microphones with distances between the microphones, wherein the greatest common factor of the distances between the microphones is less than the speed of sound divided by $f_{max}$. More particularly, where the microphones are spaced a total distance, the number of the more than two microphones is less than the one half the total distance times the upper frequency limit divided by the speed of sound.

12 Claims, 7 Drawing Sheets

OTHER PUBLICATIONS

Omologo et al., "Microphone Array Based Speech Recognition with Different Talker-Array Positions", IEEE, Apr. 21, 1997, pp. 227-230.

International Search Report, May 11, 2002.
International Search Report, Nov. 15, 2002.
International Search Report, Sep. 26, 2002, ISA/EPO.

* cited by examiner

SPACING FOR MICROPHONE ELEMENTS

RELATED APPLICATIONS

This application claims priority under 35 U.S.C. 119(e) of the U.S. Provisional Application No. 60/311,025, entitled "INTEGRATED SOUND INPUT SYSTEM", filed Aug. 8, 2001 by inventors Kim E. Silverman, Laurent J. Cerveau, and Matthias U. Neeracher, and to the U.S. Provisional Application No. 60/311,026, entitled "SPACING FOR MICROPHONE ELEMENTS", filed Aug. 8, 2001 by inventors Kim E. Silverman and Devang K. Naik, which are incorporated by reference.

This application is related to the commonly assigned application Ser. No. 10/172,593 entitled "INTEGRATED SOUND INPUT SYSTEM" filed on Jun. 13, 2002 by inventors Kim E. Silverman, Laurent J. Cerveau, and Matthias U. Neeracher, which is incorporated herein by reference.

FIELD OF THE INVENTION

The present invention relates generally to computer systems. More particularly, the present invention relates to speech processing for computer systems.

BACKGROUND OF THE INVENTION

Computer systems, such as speech recognition systems use a microphone to capture sound.

To facilitate discussion, FIG. 1 is a schematic view of a microphone array 102 that may be used in the prior art. Such an array may provide microphones 104 mounted on a display 108. The spacing between the microphones 104 in the microphone array is an equal spacing "d" between each microphone. In this example the total distance between microphones is about 30 centimeters (cm), so that d is about 15 cm. In speech recognition systems, a microphone array may be used to increase the signal to noise ratio by adding signals from each microphone in the microphone array. A user 112 positioned in front of the microphones 104 would speak, so that the sound waves from the user 112 would reach each microphone 104 in the microphone array 102 at about the same time. The signals from each microphone 104 would then be added in a constructive manner. Background noise may be generated by a noise source 116 located off axis from the microphone array 102. Sound 120 from the noise source 116 would reach the microphones 104 at different times, so that the signals from the different microphones would not normally be added in a constructive manner. However, if the background noise from the noise source has a wavelength ($\lambda$) of d/n, where n is an integer, then the microphones 104 would be simultaneously located at the maximums of the background noise causing a constructive addition of the signals from the microphones 104 (resonance interference). Generally, the speed of sound in dry air at about 1 atmospheres is about: v=331 m/s+(0.6 m/s/C)*T. So at about 20° C., the speed of sound in air is about 343 m/s. With distance being about 15 cm., the frequencies (f) that would cause the resonance interference so that the addition of signals from the microphones 104 would be constructively added would be f=(34,300 cm/s)*n/(15 cm)=n(1,143 Hz). For some voice recognition systems it may be desirable to process sounds with frequencies between 140 to 6,500 Hz. Therefore n=1, 2, 3, 4, 5 would yield frequencies of 1,143 Hz, 2,286 Hz, 3,429 Hz, 4,572 Hz, and 5,715 Hz, which would be within the range on a voice recognition system.

FIG. 2 is another schematic view of a microphone array 202 that may be used in the prior art. Such an array may provide microphones 204 mounted on a display 208, in a manner similar to the array in FIG. 1. The spacing between the microphones 204 in the microphone array is an equal spacing "d" between each microphone. In this example the total distance between microphones is about 30 centimeters (cm), so that d is about 15 cm. However, an additional microphone 205 is added to the array 208 between two microphones 204, so that the spacing between the additional microphone 205 and the two microphones 204 is ½ d (7.5 cm). A user 212 positioned in front of the microphone array 202 would speak, so that the sound waves from the user 212 would reach each microphone 204, 205 in the microphone array 202 at about the same time. The signals from each microphone 204, 205 would then be added in a constructive manner. Background noise may be generated by a noise source 216 located off axis from the microphone array 202. Sound 220 from the noise source 216 would reach the microphones 204 at different times, so that the signals from the different microphones would not normally be added in a constructive manner. However, if the background noise from the noise source has a wavelength ($\lambda$) of (1/2)(d/n), where n is an integer, then the microphones 204, 205 would be simultaneously located at the maximums of the background noise causing a constructive addition of the signals from the microphones 204, 205 (resonance interference). Thus, the additional microphone 205 causes the wavelength to be 7.5 cm/n. Generally, the speed of sound in dry air at about 1 atmospheres is about: v=331 m/s+(0.6 m/s/C)*T. So at about 20° C., the speed of sound in air is about 343 m/s. With the extra microphone 205 spaced 7.5 cm from the other microphones 204, the frequencies (f) that would cause the resonance interference so that the addition of signals from the microphones 204, 205 would be constructively added would be f=(34,300 cm/s)*n/(7.5 cm)=n(2,286 Hz). Therefore n=1 and 2, would yield frequencies of 2,286 Hz, 4,572 Hz, which would be within the range of a voice recognition system.

To provide improved signal to noise output more microphones may be provided to the array. FIG. 3 is another schematic view of a microphone array 302 that may be used in the prior art. Such an array may provide four microphones 304 mounted on a display 308. The spacing between the microphones 304 in the microphone array is an equal spacing "d" between each microphone. In this example the total distance between microphones is about 30 centimeters (cm), so that d is about 10 cm. In speech recognition systems, a microphone array may be used to increase the signal to noise ratio by adding signals from each microphone in the microphone array. A user 312 positioned in front of the microphones 304 would speak, so that the sound waves from the user 312 would reach each microphone 304 in the microphone array 302 at about the same time. The signals from each microphone 304 would then be added in a constructive manner. Background noise may be generated by a noise source 316 located off axis from the microphone array 302. Sound 320 from the noise source 316 would reach the microphones 304 at different times, so that the signals from the different microphones would not normally be added in a constructive manner. However, if the background noise from the noise source has a wavelength ($\lambda$) of d/n, where n is an integer, then the microphones 304 would be simultaneously located at the maximums of the background noise causing a constructive addition of the signals from the microphones 304 (resonance interference). With distance being about 10 cm., the frequencies (f) that would cause the resonance interference so that the addition of signals from the microphones 304 would be constructively added would be $f=(34,300 \text{ cm/s})*n/(10 \text{ cm})=n(3,430 \text{ Hz})$. Therefore n=1, would yield frequencies of 3,430 Hz, which would be within the range of some voice recognition systems.

It would be desirable to provide a computer system with speech recognition, with a microphone array where the frequency of resonance interference would be outside of or near the outside of the human voice range and may even be outside of a microphone sound range or even outside of the voice recognition range.

SUMMARY OF THE INVENTION

To achieve the foregoing and other objects and in accordance with the purpose of the present invention, a variety of techniques is provided for a speech recognition device with a frequency range where an upper frequency limit $f_{max}$ is provided. The speech recognition device has more than two microphones with distances between the microphones, wherein the greatest common factor of the distances between the microphones is less than the speed of sound divided by $f_{max}$.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well-known process steps and/or structures have not been described in detail in order to not unnecessarily obscure the present invention.

Figure 1:
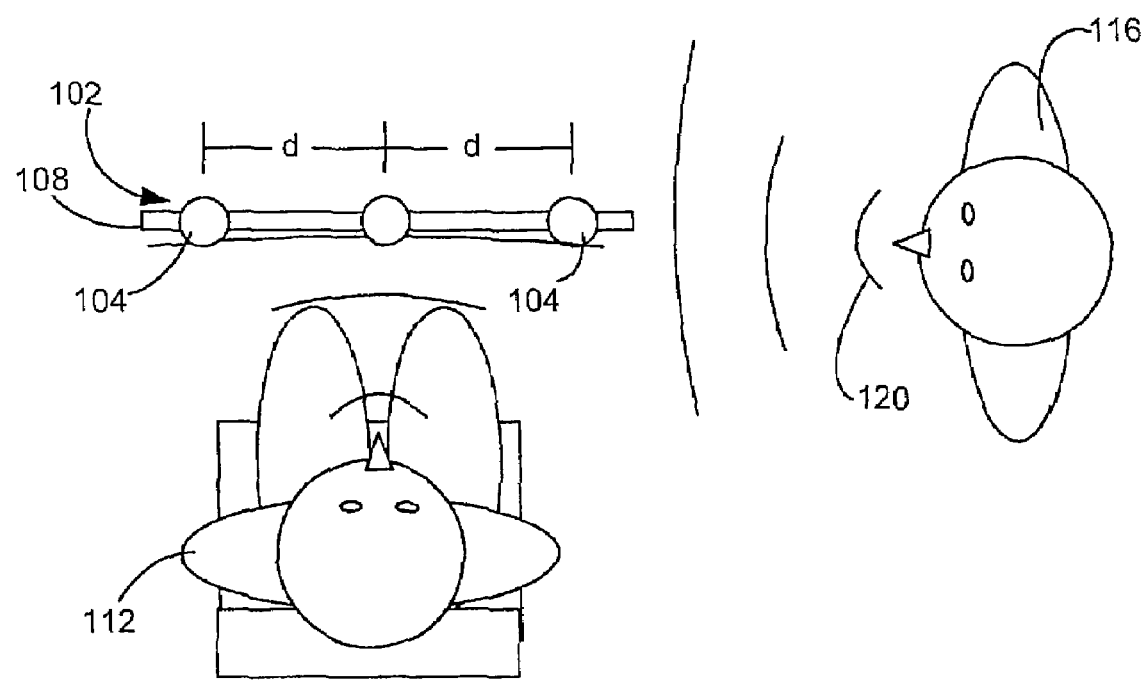
FIG. 1 is a schematic view of a microphone array that may be used in the prior art.
Figure 2:
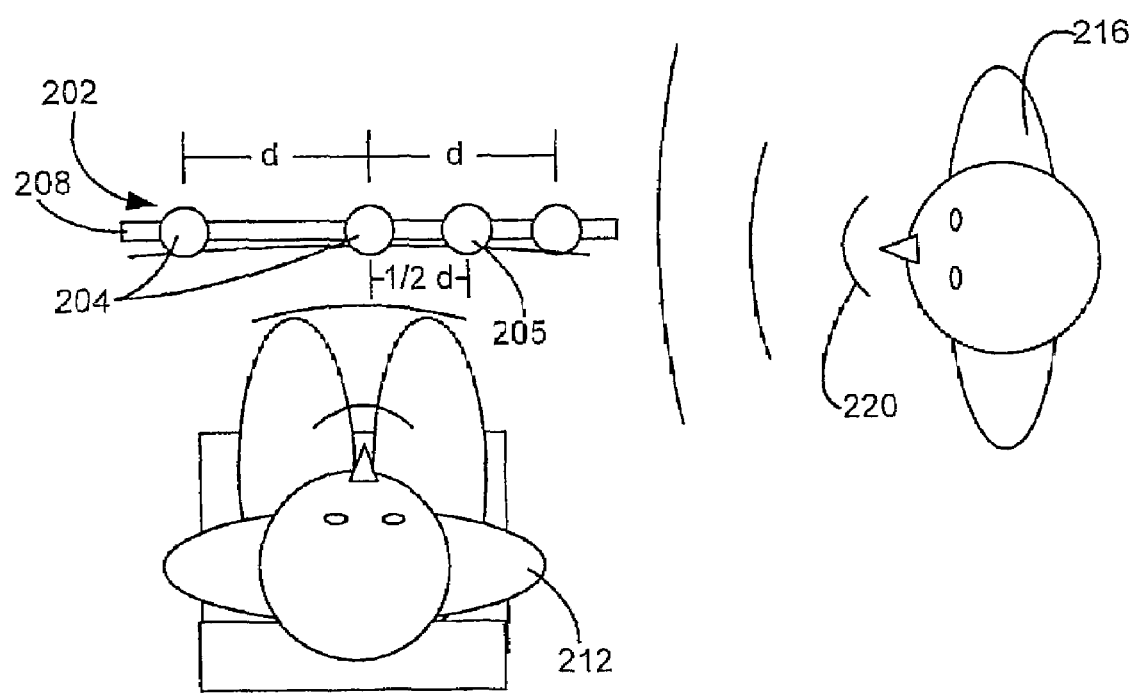
FIG. 2 is another schematic view of a microphone array that may be used in the prior art.
Figure 3:
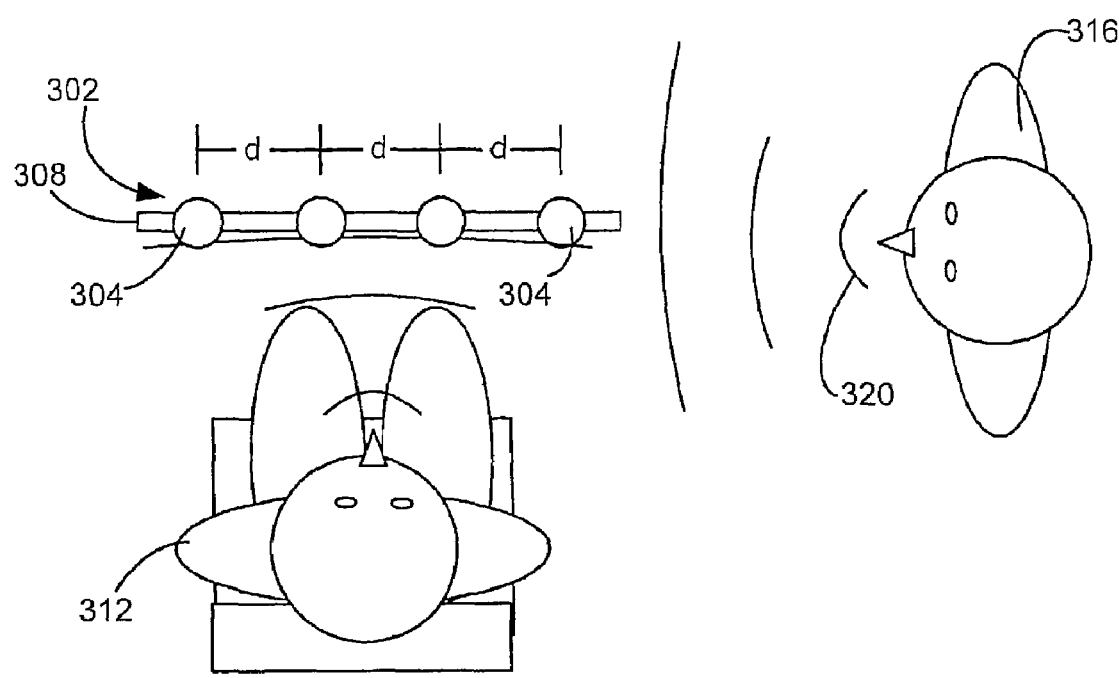
FIG. 3 is another schematic view of a microphone array that may be used in the prior art.
Figure 4:
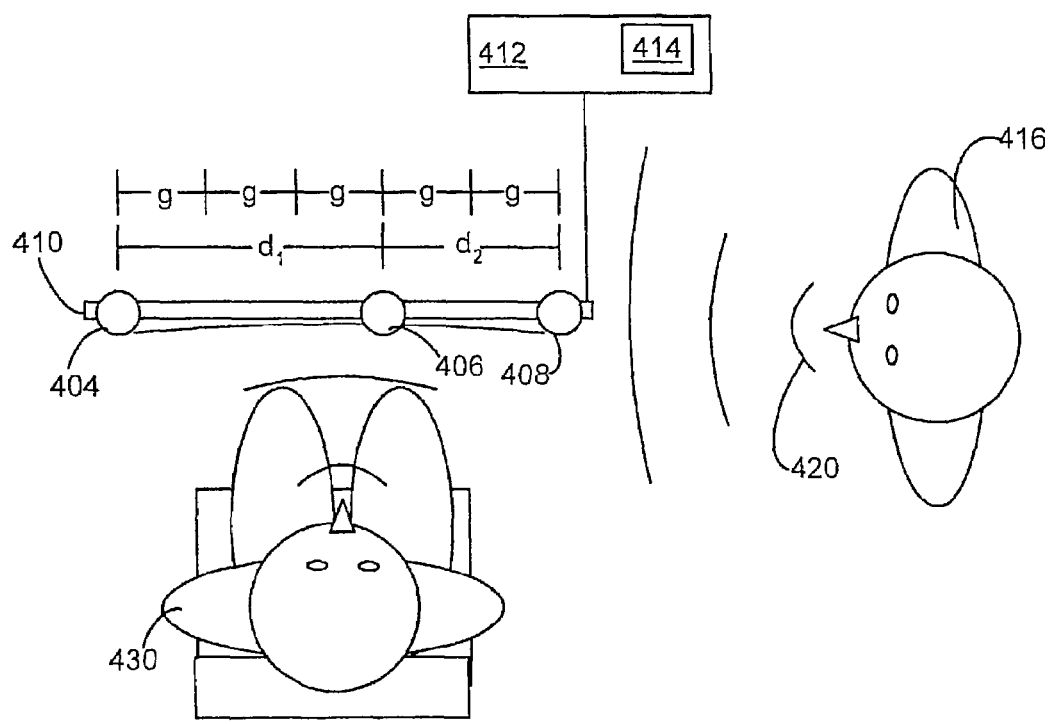
FIG. 4 is a schematic bird's eye view of a preferred embodiment of the invention.

To facilitate discussion, FIG. 4 is a bird's eye view of a top view of a an array of a first, second, and third microphones 404, 406, 408 mounted on a computer system comprising a display 410, and a chassis 412, which supports a speech recognition system 414. A distance $d_1$ is between the first microphone 404 and the second microphone 406. A distance $d_2$ is between the second microphone 406 and the third microphone 408. A distance "g" is also shown in FIG. 4, where "g" is the greatest common factor between $d_1$ and $d_2$. In the specification and claims the greatest common factor is defined as the largest distance that is evenly divisible into two or more distances. Since "g" is the greatest common factor between $d_1$ and $d_2$, then "g" is the greatest distance where the relationship of $m_1*g=d_1$ and $m_2*g=d_2$, where $m_1$ and $m_2$ are integers greater than zero. In the embodiment illustrated in FIG. 4, $m_1=3$ and $m_2=2$.

In operation, a user 430 positioned in front of the microphones 404, 406, 408 would speak, so that the sound waves from the user 430 would reach each microphone 404, 406, 408 at about the same time. The signals from each microphone 404, 406, 408 would then be sent to the voice recognition system 414 in the chassis, where the signals may be added in a constructive manner. Background noise may be generated by a noise source 416 located off axis from the microphones. Sound 420 from the noise source 416 would reach the microphones 404, 406, 408 at different times, so that the signals from the different microphones would not normally be added in a constructive manner. However, if the background noise from the noise source has a wavelength ($\lambda$) of g/n, where n is an integer, then the microphones 404, 406, 408 would be simultaneously located at the maximums of the background noise causing a constructive addition of the signals from the microphones 404, 406, 408 (resonance interference). The invention uses the upper frequency $f_{max}$ of the voice recognition system to obtain a minimum wavelength $\lambda_{min}$. In this embodiment, the frequency range of the voice recognition system 414 is 140 to 6,500 Hz. Therefore $f_{max}$ is 6,500 Hz. The invention then specifies that $g<v/f_{max}=\lambda_{min}$, where v is the speed of sound in air. For example, generally, the speed of sound in dry air at about 1 atmospheres is about: $v=331 \text{ m/s}+(0.6 \text{ m/s/C})*T$. So at about 20° C., the speed of sound in air is about 343 m/s. Therefore, the invention would require that $g<\lambda_{min}=343$ m/s/6,500 Hz=0.0528 m=5. Therefore, if the greatest common factor is less than 5.28 cm, then the lowest frequency that would cause resonance interference would have a wavelength less than 5.28 cm. Since signals with a wavelength less than $\lambda_{min}=5.28$ cm have a frequency beyond the range of the voice recognition system 414, such sounds should not be registered as background noise by the voice recognition system. Therefore if the first microphone 404 is placed a distance 3*5.20 cm=15.6 cm from the second microphone 406 and the second microphone is placed a distance of 2*5.20 cm.=10.4 cm from the third microphone 408, then frequencies that would cause resonance interference would be beyond the range of the voice recognition system 414. This would result in the first microphone 404 being spaced from the third microphone a total distance of 15.6 cm+10.4 cm=26 cm.

In the preferred embodiment, the first microphone 404, second microphone 406, and third microphone 408 are mounted on the display 410, although the microphones may be mounted on other parts of the computer system. The distance $d_1$ between the first microphone 404 and the second microphone 406 and the distance $d_2$ between the second microphone 406 and the third microphone 408 is set in a program of the voice recognition system 414, so that the voice recognition system 414 makes use of these distances during the voice recognition process. One way for allowing these distances to be placed in the voice recognition system 414 is by fixing the microphones to the computer system so that the microphones 404, 406, 408 may not be moved relative to each other, so that these distances cannot be changed. Integers $m_1$ and $m_2$ may not have a common factor. This is because if $m_1$ and $m_2$ had a common factor "c", then the greatest common factor would not be "g", but would instead be g*c. In a more preferred embodiment of the invention, $m_1$ and $m_2$ would be prime numbers to ensure that they do not have a common factor.

In voice recognition systems, it may be desirable to spread the microphones further apart. One way of this may be achieved is by increasing $m_1$ and $m_2$. For example, if $m_1$ is 9 and $m_2$ is 11 with the greatest common factor "g" being 5.20 cm., then $d_1=m_1*5.20$ cm=46.80 cm. and $d_2=m_2*5.20=57.20$ cm. This would allow the first microphone 404 to be separated from the third microphone 408 by a distance of 104.00 cm.

Figure 5:
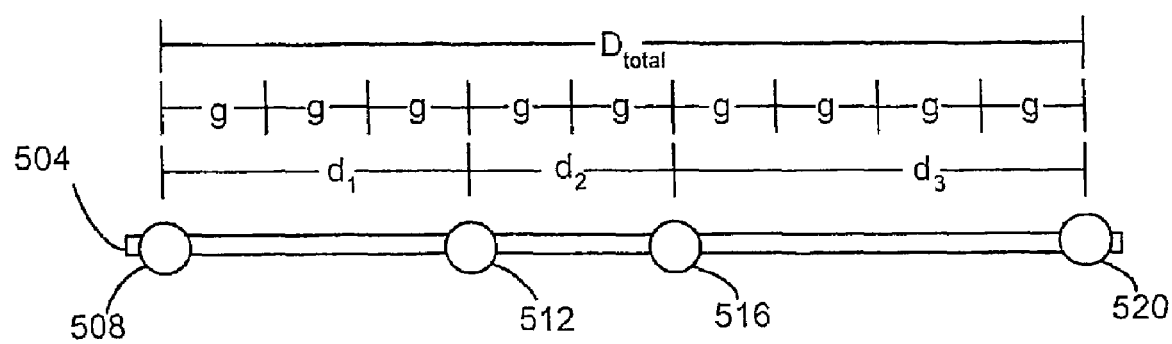
FIG. 5 is another schematic illustration of another embodiment of the invention, using four microphones.

Other embodiments may use more than three microphones. FIG. 5 is a schematic illustration of a display 504 with a first microphone 508, a second microphone 512, a third microphone 516, and a fourth microphone 520 mounted on the display 504. The first distance between the first microphone 508 and the second microphone 512 is distance $d_1$. The second distance between the second microphone 512 and the third microphone 516 is distance $d_2$. The third distance between the third microphone 516 and the fourth microphone 520 is distance $d_3$. In this example, the greatest common factor "g" is divisible into the first distance $d_1$, the second distance $d_2$, and the third distance $d_3$, such that $m_1*g=d_1$, $m_2*g=d_2$, and $m_3*g=d_3$, where $m_1=3$, $m_2=2$, and $m_3=4$. Although $m_2$ and $m_3$ have a common factor of 2, $m_1$, $m_2$, and $m_3$ do not have a common factor, and therefore "g" is the greatest common factor between $d_1$, $d_2$, and $d_3$.

The use of too many microphones may cause additional problems, since microphones may fail and add additional costs. Therefore, it may be desirable to limit the number of microphones used by the invention. In the preferred embodiment, if the total distance between the first and last microphone (the sum of all distances between adjacent microphones) is $D_{total}$, then the number of microphones N is preferably less than $\frac{1}{2}*(D_{total}/\lambda_{min})=\frac{1}{2}*(D_{total}*f_{max}/v)$. If there are N microphones, there will be N1 distances $d_1$, $d_2$, ... $d_{N1}$.

Figure 6A:
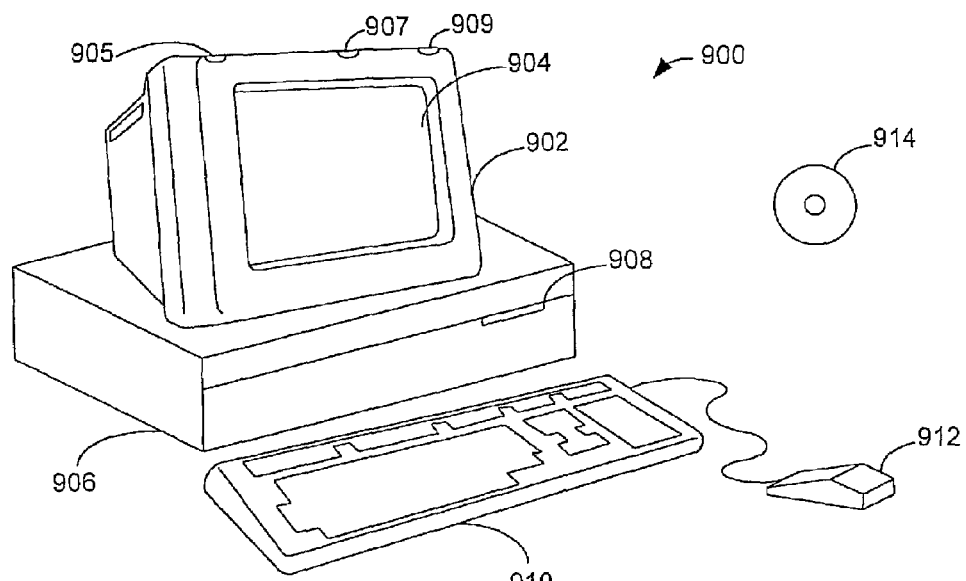
FIGS. 6A and 6B illustrate a computer system, which is suitable for implementing embodiments of the present invention.
Figure 6B:
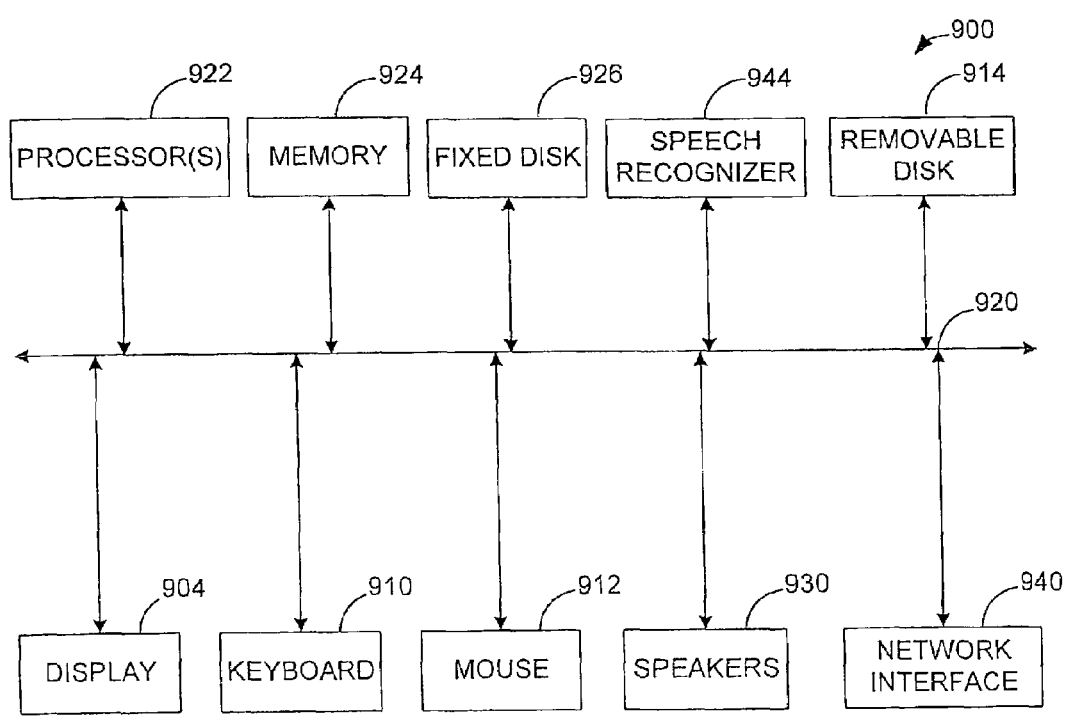

FIGS. 6A and 6B illustrate a computer system, which is suitable for implementing embodiments of the present invention. FIG. 6A shows one possible physical form of the computer system. Of course, the computer system may have many physical forms ranging from an integrated circuit, a printed circuit board, and a small handheld device up to a desktop personal computer. Computer system 900 includes a monitor 902 with a display 904, first microphone 905, a second microphone 907 and a third microphone 909, a chassis 906, a disk drive 908, a keyboard 910, and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below. A speech recognizer 944 is also attached to the system bus 920. The speech recognizer 944 may be connected to the first microphone 905, the second microphone 907, and the third microphone to form an integrated speech recognition system in which known distances between the microphones are used by the speech recognizer 944.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing. The chassis 906 may be used to house the fixed disk 926, memory 924, network interface 940, and processors 922.

In addition, embodiments of the present invention may further relate to computer storage products with a computer-readable medium that have computer code thereon for performing various computer-implemented operations, such as voice recognition using the distances between the microphones. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Figure 7:
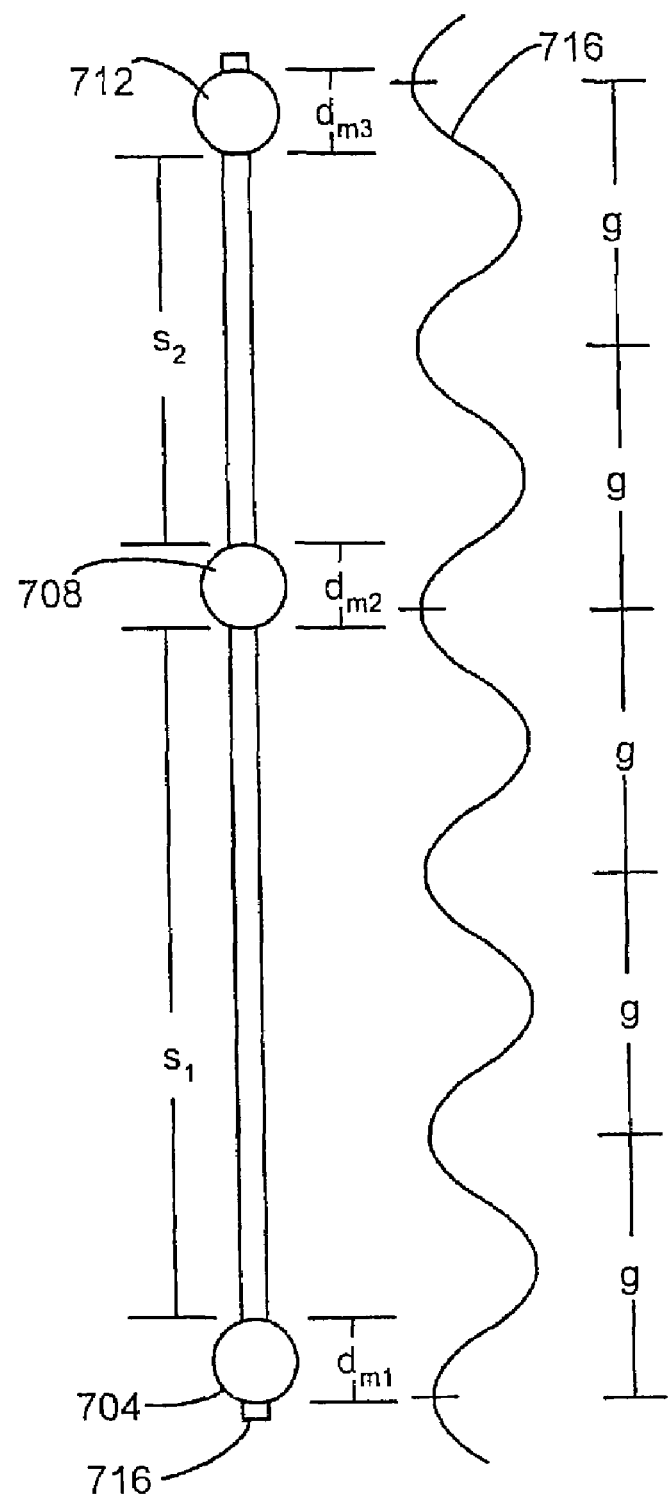
FIG. 7 is a schematic illustration of another embodiment of the invention.

FIG. 7 is a schematic illustration of another embodiment of the invention. In the previous embodiment, the microphones were approximated as single points with no width. This approximation is satisfactory, if the width of the sensitive region of the microphone is small compared to the distances separating the microphone. In this embodiment the width of the sensitive region of the microphones is accounted for. In FIG. 7 a first microphone 704, a second microphone 708, and a third microphone 712 are mounted on a mounting device 716, which forms part of a computer system. The first microphone 704 has a first active width $d_{m1}$. The first active width is a width of the sensitive region of the microphone, which may be the width of an aperture in the microphone through which the sound passes. For this reason, the first microphone 704 is illustrated as a circular aperture. In the same way, the second microphone 708 has a second active width $d_{m2}$ and the third microphone 712 has a third active width $d_{m3}$. The active widths of the first, second and third microphones may be all the same width or may be different widths. The first microphone 704 is spaced from the second microphone 708 by a first separation distance $s_1$. This separation distance is from a side of the first microphone 704 to a side of the second microphone 708, as shown in FIG. 7. Likewise, the second microphone 708 is spaced from the third microphone 712 by a separation distance $s_2$. A signal 716 with a wavelength of "g" is also shown in FIG. 7. As shown in FIG. 7, two wavelengths 2g extend across the second separation distance $s_2$ and almost the entire second active width $d_{m2}$ and almost the entire third active width $d_{m3}$. Therefore, $2g \approx s_2 + d_{m2} + d_{m3}$. On the other hand, three wavelengths 3g extend across the first separation distance $s_1$ and just a little of the second active width $d_{m2}$ and almost the entire first active width $d_{m1}$. Therefore, $3g \approx s_1 + d_{m1}$. Therefore in this embodiment the invention then specifies that $g < v/f_{max}$, where v is the speed of sound in air and where g is the greatest common factor for all distances between microphones. The distance $d_n$ between a microphone n and microphone n+1 is any length between the separation distance $s_n$ between microphone n and microphone n+1 and the separation distance $s_n$ between microphone n and microphone n+1 added to the active width $d_{mn}$ of microphone n and the active width $d_{mn+1}$ of microphone n+1 ($s_n \leq d_n \leq s_n + d_{mn} + d_{mn+1}$).

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A speech recognition device with a frequency range with an upper frequency limit (fmax), comprising:
   more than two microphones with distances between the microphones;
   wherein the greatest common factor of the distances between the microphones is less than the speed of sound divided by the upper frequency limit (fmax);
   wherein the microphones are spaced a total distance and the number of the more than two microphones is less than the one half the total distance times the upper frequency limit (fmax) divided by the speed of sound for receiving an input signal; and
   a speech recognizer for recognizing speech in the input signal.

2. The speech recognition device, as recited in claim 1, further comprising a computer readable medium on which the distances between the microphones is stored.

3. The speech recognition device, as recited in claim 2, wherein each microphone has a microphone width and adjacent microphones are separated from each other by a separation distance, wherein the distances between may be any distance between the separation distance between two adjacent microphones and the sum of the separation distance between two adjacent microphones added to the widths of each of the two adjacent microphones.

4. The speech recognition device, as recited in claim 3, wherein the microphones are mounted on a display.

5. The speech recognition device, as recited in claim 3, further comprising a computer system, comprising:
   a display, upon which the microphones are mounted;
   a chassis, connected to the microphones and display, wherein the computer readable medium is part of the computer system, and wherein the computer readable medium further comprises computer readable code to provide speech recognition, which uses the stored distances.

6. The speech recognition device, as recited in claim 3, further comprising a computer system a chassis, connected to the microphones wherein the computer readable medium is part of the computer system, and wherein the computer readable medium further comprises computer readable code to provide speech recognition, which uses the stored distances.

7. The speech recognition device, as recited in claim 2, further comprising a computer system, comprising:
   a display, upon which the microphones are mounted;
   a chassis, connected to the microphones and display, wherein the computer readable medium is part of the computer system, and wherein the computer readable medium further comprises computer readable code to provide speech recognition, which uses the stored distances.

8. The speech recognition device, as recited in claim 2, further comprising a computer system comprises a chassis, connected to the microphones wherein the computer readable medium is part of the computer system, and wherein the computer readable medium further comprises computer readable code to provide speech recognition, which uses the stored distances.

9. The speech recognition device, as recited in claim 1, further comprising a computer system, comprising:
   a display, upon which the microphones are mounted;
   a chassis, connected to the microphones and display; and
   a computer readable medium with computer readable code to provide speech recognition.

10. The speech recognition device, as recited in claim 1, further comprising a computer system comprising:
    a chassis, connected to the microphones; and
    a computer readable medium comprising computer readable code to provide speech recognition.

11. The speech recognition device, as recited in claim 1, further comprising a computer system, comprising:
    a display, upon which the microphones are mounted;
    a chassis, connected to the microphones and display; and
    a computer readable medium with computer readable code to provide speech recognition.

12. The speech recognition device, as recited in claim 1, further comprising a computer system comprising:
    a chassis, connected to the microphones; and
    a computer readable medium comprising computer readable code to provide speech recognition.

* * * * *

UNITED STATES PATENT AND TRADEMARK OFFICE
CERTIFICATE OF CORRECTION

PATENT NO. : 7,349,849 B2  Page 1 of 1
APPLICATION NO. : 10/206572
DATED : March 25, 2008
INVENTOR(S) : Silverman et al.

It is certified that error appears in the above-identified patent and that said Letters Patent is hereby corrected as shown below:

On the Title Page Item (73) ASSIGNEE:

Please change "Apple, Inc." to --Apple Inc.--

Signed and Sealed this

Eighth Day of July, 2008

JON W. DUDAS
*Director of the United States Patent and Trademark Office*